US012592461B2

(12) United States Patent
Lei et al.

(10) Patent No.: US 12,592,461 B2
(45) Date of Patent: Mar. 31, 2026

(54) END COVER ASSEMBLY, BATTERY CELL, BATTERY, AND ELECTRICAL APPARATUS

(71) Applicant: CONTEMPORARY AMPEREX TECHNOLOGY (HONG KONG) LIMITED, Hong Kong (CN)

(72) Inventors: Yuyong Lei, Ningde (CN); Zhijun Guo, Ningde (CN); Peng Wang, Ningde (CN); Chuan Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/056,192

(22) Filed: Feb. 18, 2025

(65) Prior Publication Data

US 2025/0192404 A1 Jun. 12, 2025

Related U.S. Application Data

(63) Continuation of application No. PCT/CN2022/113266, filed on Aug. 18, 2022.

(51) Int. Cl.
H01M 50/597 (2021.01)
H01M 50/147 (2021.01)
(Continued)

(52) U.S. Cl.
CPC ....... H01M 50/597 (2021.01); H01M 50/169 (2021.01); H01M 50/172 (2021.01);
(Continued)

(58) Field of Classification Search
CPC ............ H01M 50/147; H01M 50/531; H01M 50/597; H01M 50/586; H01M 50/566;
(Continued)

(56) References Cited

U.S. PATENT DOCUMENTS

2003/0034169 A1 2/2003 Tanaka
2015/0207135 A1 7/2015 Choi
(Continued)

FOREIGN PATENT DOCUMENTS

CN 201252123 Y 6/2009
CN 206250226 U 6/2017
(Continued)

OTHER PUBLICATIONS

The World Intellectual Property Organization (WIPO) International Search Report and Written Opinion for PCT/CN2022/113266 Dec. 20, 2022 12 Pages (including translation).
(Continued)

*Primary Examiner* — Jessie Walls-Murray
(74) *Attorney, Agent, or Firm* — ANOVA LAW GROUP, PLLC

(57) ABSTRACT

An end cover body comprises a first edge and a second edge which are oppositely arranged in the width direction of the end cover assembly; the fool-proof structural part is located on the side of the end cover body facing the interior of the battery cell; the electrode terminal passes through the end cover body, comprises a connecting area facing the interior of the battery cell; the connecting area is used for electrically connecting with a tab of an electrode assembly; in the width direction, the distance from the connecting area to the first edge is larger than the distance from the connecting area to the second edge; the fool-proof structural part is at least partially located on the side of the connecting area close to the first edge.

15 Claims, 6 Drawing Sheets

(51) Int. Cl.
| | |
|---|---|
| *H01M 50/169* | (2021.01) |
| *H01M 50/172* | (2021.01) |
| *H01M 50/471* | (2021.01) |
| *H01M 50/548* | (2021.01) |
| *H01M 50/566* | (2021.01) |
| *H01M 50/586* | (2021.01) |

(52) U.S. Cl.
CPC ....... *H01M 50/471* (2021.01); *H01M 50/548* (2021.01); *H01M 50/566* (2021.01); *H01M 50/586* (2021.01); *H01M 50/147* (2021.01); *H01M 2220/20* (2013.01)

(58) Field of Classification Search
CPC ............. H01M 50/553; H01M 50/103; H01M 50/536; H01M 50/186; H01M 50/172; H01M 50/548; H01M 50/176
See application file for complete search history.

(56) References Cited

U.S. PATENT DOCUMENTS

| | | | |
|---|---|---|---|
| 2015/0318526 A1* | 11/2015 | Mune ..................... | H01G 11/78 429/56 |
| 2018/0166676 A1 | 6/2018 | Xing et al. | |
| 2018/0261806 A1* | 9/2018 | Kawate ............... | H01M 50/474 |
| 2020/0303702 A1* | 9/2020 | Nakamura ........... | H01M 50/30 |
| 2021/0091380 A1* | 3/2021 | Atala .................. | H01M 50/172 |
| 2022/0006163 A1 | 1/2022 | Yang | |
| 2022/0247043 A1 | 8/2022 | Su et al. | |
| 2022/0302533 A1* | 9/2022 | Choi ................... | H01M 50/147 |

FOREIGN PATENT DOCUMENTS

| | | |
|---|---|---|
| CN | 208284512 U | 12/2018 |
| CN | 210576276 U | 5/2020 |
| CN | 109802061 B | 12/2021 |
| CN | 215184437 U | 12/2021 |
| CN | 215731918 U | 2/2022 |
| CN | 216120646 U | 3/2022 |
| CN | 216750092 U | 6/2022 |
| CN | 216750096 U | 6/2022 |
| WO | 2022077904 A1 | 4/2022 |

OTHER PUBLICATIONS

The European Patent Office (EPO) The Extended European Search Report for Application No. 22955334.2, Oct. 30, 2025 8 Pages.

\* cited by examiner

1000

10

END COVER ASSEMBLY, BATTERY CELL, BATTERY, AND ELECTRICAL APPARATUS

CROSS-REFERENCE TO RELATED APPLICATION

This application is a continuation of International Application No. PCT/CN2022/113266, filed on Aug. 18, 2022, the entire content of which is incorporated herein by reference.

TECHNICAL FIELD

The present application belongs to the technical field of battery production, and particularly relates to an end cover assembly, a battery cell, a battery and an electrical apparatus.

BACKGROUND

Batteries are widely used in electrical devices such as mobile phones, laptops, electromobiles, electric cars, electric airplanes, electric ships, electric toy cars, electric toy ships, electric toy airplanes, power tools, etc.

In the development of battery technology, how to improve the production efficiency of battery cells is an important research direction in battery technology.

SUMMARY

Embodiments of the present application provide an end cover assembly, a battery cell, a battery and an electrical apparatus, which can facilitate the assembling of the battery cell.

In a first aspect, an embodiment of the present application provides an end cover assembly applied to a battery cell, and the end cover assembly includes an end cover body, a fool-proof structural part, and an electrode terminal. The end cover body includes a first edge and a second edge which are oppositely arranged in the width direction of the end cover assembly; the fool-proof structural part is located on the side of the end cover body facing the interior of the battery cell; the electrode terminal passes through the end cover body; the electrode terminal includes a connecting area facing the interior of the battery cell; the connecting area is used for electrically connecting with a tab of the electrode assembly; in the width direction, the distance from the connecting area to the first edge is larger than the distance from the connecting area to the second edge; and the fool-proof structural part is at least partially located on the side of the connecting area close to the first edge.

In the embodiment of the present application, the end cover assembly is provided with the connecting area and the fool-proof structural part, which are distributed between the first edge and the second edge that are opposite in the width direction, on the side of the end cover body facing the interior of the battery cell, the distance from the connecting area to the first edge is larger than the distance from the connecting area to the second edge, and the fool-proof structural part is at least partially located on the side of the connecting area close to the first edge, so that the end cover assembly has an asymmetric structure in the width direction, the relative direction of an end cover and the electrode assembly can be conveniently distinguished, and the production efficiency and the assembly success rate of the battery cell are improved.

In some embodiments, in the thickness direction of the end cover assembly, the fool-proof structural part extends in a direction facing away from the outside of the battery cell and protrudes from the connecting area.

In the above technical solution, the fool-proof structural part protruding from the connecting area can interfere with the tab of the electrode assembly when an assembling position of the end cover assembly is wrong, and moreover, the fool-proof structural can be configured to position the electrode assembly in the width direction, so that the electrode assembly can be more accurately welded to the connecting area while the assembly success rate and the production efficiency are improved.

In some embodiments, the end cover assembly includes an insulating member, and the insulating member is arranged on the side of the end cover body facing the interior of the battery cell; and the fool-proof structural part and the insulating member are integrally formed.

In the above technical solution, the fool-proof structural part and the insulating member are integrally formed, so that the structure of the end cover assembly can be simplified, and the fool-proof structural part can be reliably installed on the end cover assembly.

In some embodiments, in the length direction of the end cover assembly, the insulating member includes a first structural part and a second structural part which are oppositely arranged; the connecting area and the fool-proof structural part are located between the first structural part and the second structural part; and the first structural part and the second structural part extend in the width direction.

In the above technical solution, the first structural part and the second structural part are arranged, so an accommodating space is provided for the tab while the end cover assembly is prevented from being reversely installed, the risk of short circuit caused by a fact that the tab is reversely inserted into the electrode assembly is reduced, and the safety performance of the battery cell is further improved.

In some embodiments, in the thickness direction of the end cover assembly, the fool-proof structural part, the first structural part and the second structural part extend in the direction facing away from the outside of the battery cell and protrude from the connecting area.

In the above technical solution, the fool-proof structural part, the first structural part and the second structural part which protrude from the connecting area can provide a better supporting effect for the tab of the electrode assembly, and moreover, the tab can interfere with the fool-proof structural part when the end cover assembly is reversely installed, so that the assembly success rate and the production efficiency are improved.

In some embodiments, the fool-proof structural part is continuously arranged in the length direction of the end cover assembly.

Due to the continuous arrangement of the fool-proof structural part, a risk of short circuit caused by welding slag falling into the battery cell when the end cover assembly and a battery cell case are welded can be reduced to a certain extent, thus further improving the safety performance of the battery cell.

In some embodiments, the fool-proof structural part is connected to at least one of the first structural part and the second structural part.

In the above technical solution, the fool-proof structural part is further connected to the first structural part and/or the second structural part, so that the risk of short circuit caused by the welding slag falling into the battery cell can be further prevented, and the safety performance of the battery cell is improved; and moreover, the fool-proof structural part is connected to the first structural part and/or the second structural part, thus the structure can be further simplified, and the manufacturability is improved.

In some embodiments, the fool-proof structural part is arranged on the side of the electrode terminal facing the electrode assembly, and is integrally formed with the electrode terminal; and in the thickness direction of the end cover assembly, projections of the fool-proof structural part and the connecting area are not overlapped.

In the above technical solution, the fool-proof structural part and the electrode terminal are integrally formed, so that the structure of the end cover assembly can be simplified; and moreover, the fool-proof structural part is arranged on the electrode terminal, thus welding positioning can be further provided for the tab and the electrode terminal.

In a second aspect, an embodiment of the present application provides a battery cell, which includes the end cover assembly according to any embodiment in the first aspect, a case and an electrode assembly. The case includes an opening, and the end cover assembly covers the opening; and the electrode assembly is arranged in the case, and includes a tab; and the tab is configured to be electrically connected to a connecting area.

In some embodiments, the case is provided with two openings which are oppositely arranged; two end cover assemblies respectively cover the two openings; and two tabs respectively extend out from two ends of the electrode assembly.

In some embodiments, the tab covers the connecting area and is connected to the electrode terminal by welding.

In some embodiments, in the width direction of the end cover assembly, the projection of a fool-proof structural part is at least partially overlapped with the projection of the tab.

In the above technical solution, when the end cover assembly is reversely installed, at least one part of the tab can be interfered by the fool-proof structural part.

In some embodiments, the battery cell further includes an adapter sheet, and the adapter sheet is configured to electrically connect the tab and the electrode terminal; in the thickness direction of the end cover assembly, the adapter sheet is arranged between the tab and the connecting area; and in the width direction of the end cover assembly, the projection of the fool-proof structural part is at least partially overlapped with the projection of the adapter sheet and/or the tab.

In the above technical solution, when the end cover assembly is reversely installed, at least one part of the tab or the adapter sheet can be interfered by the fool-proof structural part.

In a third aspect, an embodiment of the present application provides a battery, which includes the battery cell according to any embodiment in the second aspect.

In a fourth aspect, an embodiment of the present application provides an electrical apparatus, which includes the battery cell according to any embodiment in the second aspect, and the battery cell is used for providing electric energy.

DESCRIPTION OF DRAWINGS

In order to more clearly illustrate the technical solution of the embodiments of the present application, the drawings that need to be used in the embodiments of the present application will be briefly introduced below, and it is obvious that the drawings described below are only some embodiments of the present application, and for those skilled in the art, other drawings can also be obtained according to the drawings without paying creative labor.

DESCRIPTION OF REFERENCE NUMERALS

Figure 1:
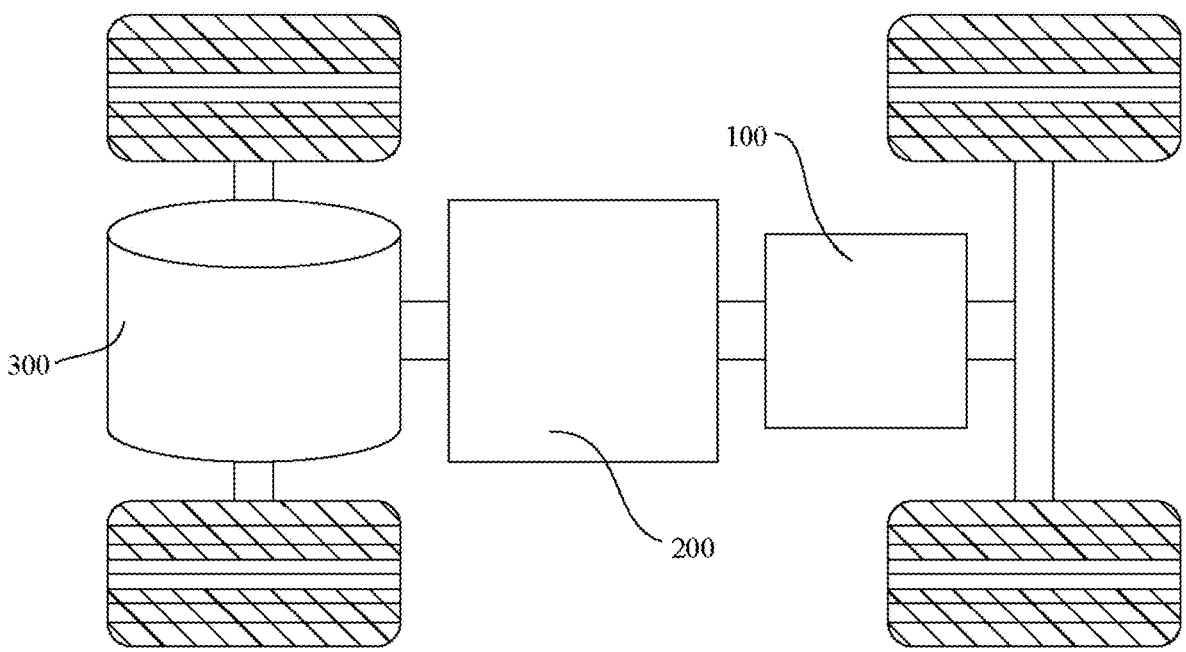
FIG. 1 is a structural schematic diagram of a vehicle according to some embodiments of the present application.

1000, vehicle; 100, battery; 200, controller; 300, motor; 20, box; 201, first box part; 202, second box part; 10, battery cell; 1, end cover assembly; 101, end cover body; 101a, first edge; 101b, second edge; 11, fool-proof structural part; 12, electrode terminal; 121, connecting area; 13, insulating member; 131, first structural part; 132, second structural part; 2, case; 21, opening; 3, electrode assembly; 31, tab; 4, insulation film;

X, width direction; Y, length direction; and Z, thickness direction.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application have the same meanings as generally understood by those skilled in the technical art of the present application; the terms used in the description of the present application are for the purpose of describing specific embodiments only and are not intended to limit the present application; the terms "include" and "have" in the description and claims of the present application and in the description of the above accompanying drawings and any variation thereof are intended to cover the non-exclusive inclusion. The terms "first", "second", etc. in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection" and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship. In this disclosure, unless otherwise specified, phrases like "at least one of A, B, and C" and "at least one of A, B, or C" both mean only A, only B, only C, or any combination of A, B, and C.

In the embodiments of the present application, the same reference signs denote the same components, and for the sake of brevity, detailed descriptions of the same components are omitted in different embodiments. It is to be understood that the thickness, length, width and other dimensions of various components in the embodiments of the present application shown in the accompanying drawings, as well as the overall thickness, length, width and other dimensions of an integrated apparatus, are for illustrative purposes only, and should not constitute any limitation to the present application.

The term "a plurality of" in the present application refers to more than two (inclusive).

The term "parallel" in the present application includes not only absolute parallel cases, but also approximately parallel cases that are commonly known in engineering; and moreover, "vertical" also includes not only absolute vertical cases, but also approximately vertical cases that are commonly known in engineering.

In the present application, a battery cell may include a secondary lithium-ion battery cell, a primary lithium-ion battery cell, a lithium-sulfur battery cell, a sodium lithium-ion battery cell, a sodium-ion battery cell or a magnesium-ion battery cell, etc., which is not limited in the embodiment of the present application. The battery cell may be in a shape of a cylinder, a flat body, a cuboid or other shapes, which is not limited in the embodiment of the present application.

The battery mentioned in the embodiments of the present application refers to a single physical module including one or more battery cells to provide higher voltage and capacity. The battery generally includes a box for packaging one or more battery cells. The box can avoid liquids or other foreign objects affecting the charging or discharging of the battery cell.

The battery cell includes an electrode assembly and an electrolyte; and the electrode assembly includes a positive electrode plate, a negative electrode plate and a spacer. The battery cell mainly works by means of movement of metal ions between the positive electrode plate and the negative electrode plate. The positive electrode plate includes a positive electrode current collector and a positive electrode active material layer, and the positive electrode active material layer coats a surface of the positive electrode current collector. By taking a lithium-ion battery as an example, the material of the positive electrode current collector may be aluminum, the positive electrode active material layer includes a positive electrode active material, and the positive electrode active material may be lithium cobalt oxide, lithium iron phosphate, ternary lithium or lithium manganate and the like. The negative electrode plate includes a negative electrode current collector and a negative electrode active material layer, and the negative electrode active material layer coats the surface of the negative electrode current collector. The material of the negative electrode current collector may be copper, the negative electrode active material layer includes a negative electrode active material, and the negative electrode active material may be carbon or silicon and the like. The material of the spacer may be PP (polypropylene) or PE (polyethylene) and the like.

From the perspective of current development of the market situation, the application of power batteries is becoming more and more extensive. Power batteries are not only applied in energy storage power source systems such as water, fire, wind and solar power stations, but also widely applied in electric transport tools, such as electric bicycles, electric motorcycles, and electric vehicles, as well as many fields, such as military equipment and aerospace. With the continuous expansion of the application field of power batteries, the demand in the market is also constantly expanding.

In related technologies, in the production process of battery cells, there is an installation direction between an end cover and an electrode assembly, so that a preset relative direction is maintained between the end cover and the electrode assembly, and the end cover and the electrode assembly can be successfully welded.

However, in the production process such as the above, the inventor noticed that the end cover of the battery cell is often symmetrically arranged, and it is difficult to determine whether the relative direction between the end cover and the electrode assembly is correct or not when welding the end cover and the electrode assembly to each other, and it is often difficult to electrically connect the end cover to the electrode assembly, or the end cover and the case of the battery cell are difficult to weld due to reverse installation of the end cover.

In view of this, an embodiment of the present application provides an end cover, which includes an end cover body, a fool-proof structural part and an electrode terminal; a connecting area and the fool-proof structural part which are distributed between a first edge and a second edge that are opposite in the width direction are arranged on the side of the end cover body facing the interior of the battery cell; the distance from the connecting area to the first edge is larger than the distance from the connecting area to the second edge; the fool-proof structural part is at least partially arranged on the side of the connecting area near to the first edge, so that the end cover assembly has an asymmetric structure in the width direction, the relative direction of the end cover and the electrode assembly can be convenient to distinguish, and the production efficiency and the assembly accuracy of the battery cell can be improved.

The technical solution described in the embodiments of the present application is applicable to the end cover, the battery cell assembled with the end cover, the battery employing the battery cell, and the electrical apparatus powered by the battery cell.

The electrical apparatus may be a vehicle, a mobile phone, a portable device, a laptop, a ship, a spacecraft, an electric toy, an electric tool and the like. The vehicle may be a fuel vehicle, a gas vehicle, or a new energy vehicle. The new energy vehicle may be an all-electric vehicle, a hybrid electric vehicle, an extended-range electric vehicle, or the like. The spacecraft includes an airplane, a rocket, a space shuttle, a spaceship, and the like. The electric toy includes a fixed or mobile electric toy, such as a game console, an electric car toy, an electric ship toy, and an electric aircraft toy. The electric tool includes a metal cutting electric tool, a grinding electric tool, an assembly electric tool, and a railway electric tool, such as an electric drill, an electric grinder, an electric wrench, an electric a screwdriver, an electric hammer, an impact drill, a concrete vibrator, and an electric planer. The electrical apparatus is not specially limited in the embodiments of the present application.

It is to be understood that the technical solution described in the embodiment of the present application is not only limited to the electrical apparatus described above, but in order to be concise, the following embodiment is illustrated with a vehicle 1000 as an example.

FIG. 1 is a structural schematic diagram of a vehicle 1000 according to some embodiments of the present application. As shown in FIG. 1, the vehicle 1000 may be a fuel vehicle, a gas vehicle or a new energy vehicle, and the new energy vehicle may be a pure electric vehicle, a hybrid electric vehicle or an extended-range vehicle and the like. A battery 100 is arranged in the vehicle 1000, and the battery 100 can be arranged at the bottom or the head or the tail of the vehicle 1000.

In order to meet different power consumption requirements, a plurality of battery cells 10 can be arranged in the battery 100 in the vehicle 1000. The battery 100 can be used for supplying power to the vehicle 1000, for example, the battery 100 can be used as an operation power source of the vehicle 1000. The vehicle 1000 may further include a controller 200 and a motor 300. The controller 200 is configured to control the battery 100 to supply power to the motor 300, for example, to supply power for starting, navigation and driving of the vehicle 1000. In some embodiments of the present application, the battery 100 can serve as the operation power source of the vehicle 1000 and can also serve as a driving power source of the vehicle 1000, and replaces or partially replace fuel oil or natural gas to provide driving power for the vehicle 1000.

Figure 2:
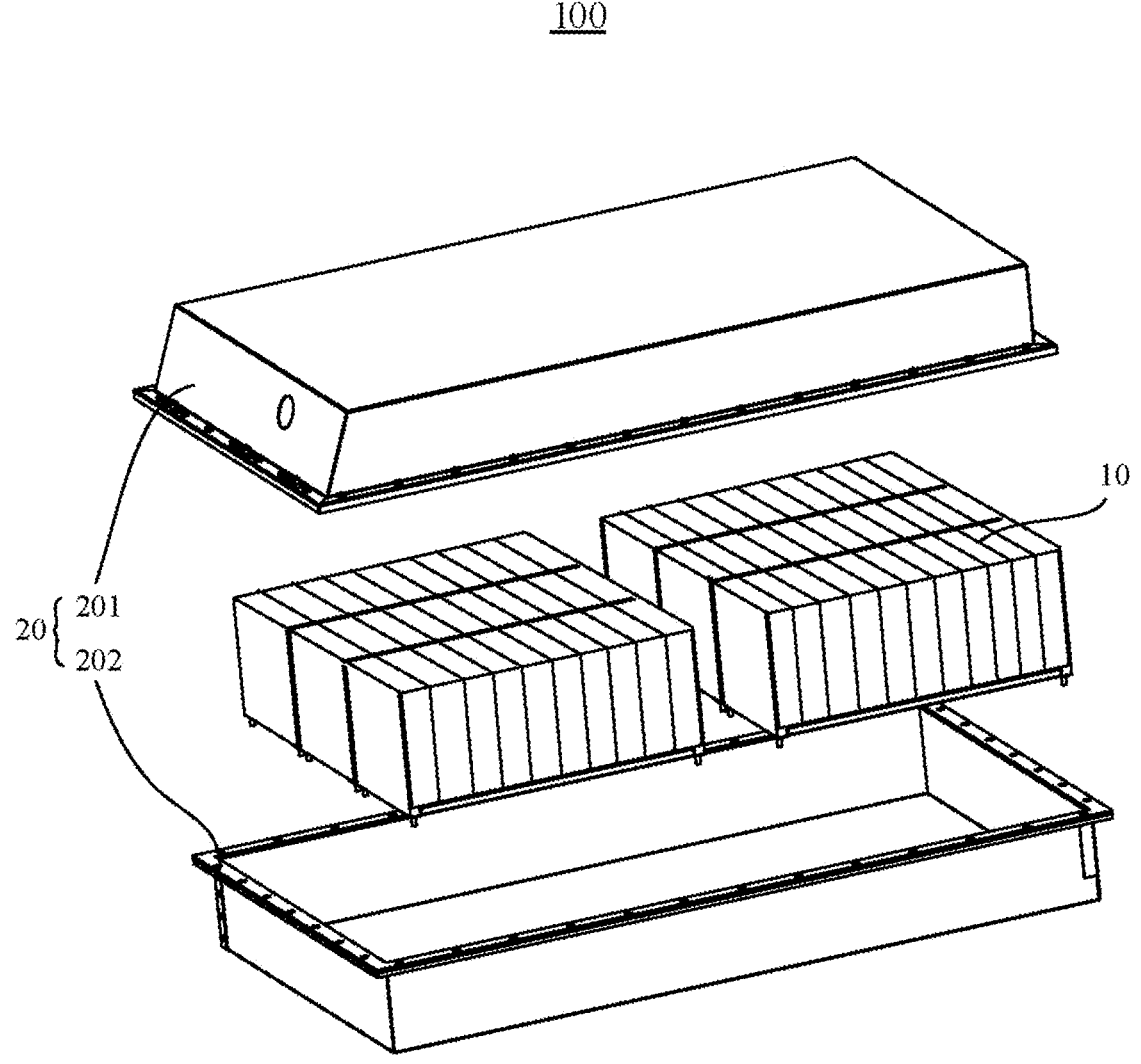
FIG. 2 is a structural schematic diagram of a battery according to some embodiments of the present application.

FIG. 2 is a structural schematic diagram of a battery 100 according to some embodiments of the present application. As shown in FIG. 2, the battery 100 includes a box 20 and battery cells 10; and a plurality of battery cells 10 are accommodated in the box 20.

The box 20 may be a simple three-dimensional structure such as an independent cuboid or cylinder or sphere, and may also be a complex three-dimensional structure formed by combining simple three-dimensional structures such as cuboids or cylinders or spheres, which is not limited in the embodiments of the present application. The material of the box 20 can be alloy materials such as aluminum alloy and iron alloy, can also be high molecular materials such as polycarbonate and polyisocyanurate foam plastic, or can be a composite material of glass fibers and epoxy resin, which is not limited in the embodiments of the present application.

The box is 20 used for accommodating the battery 100 and may be in various structural forms. In some embodiments, the box 20 may include a first box part 201 and a second box part 202; the first box part 201 and the second box part 202 are mutually covered; the first box part 201 and the second box part 202 jointly define an accommodating space used for accommodating the battery 100. The second box part 202 may be of a hollow structure with an opening 21 formed in one end; the first box part 201 is of a plate-shaped structure, and the first box part 201 covers the opening side of the second box part 202 to form the box 20 with the accommodating space; each of the first box part 201 and the second box part 202 may also be of a hollow structure with an opening 21 formed in one side; and the opening 21 side of the first box part 201 covers the opening 21 side of the second box part 202 to form the box 20 with the accommodating space. Definitely, the first box part 201 and the second box part 202 may be in various shapes, such as cylinders and cuboids.

In order to improve the sealing performance after the first box part 201 and the second box part 202 are connected, a sealing member such as a sealant and a sealing ring may also be arranged between the first box part 201 and the second box part 202.

In the box 20, one or a plurality of battery cells 10 can be arranged. If a plurality of battery cells 10 are arranged, the plurality of battery cells 10 can be connected in series or in parallel or in series-parallel connection; series-parallel connection refers to that the plurality of battery cells 10 are connected in series and in parallel. The plurality of battery cells 10 can be directly connected in series or in parallel or in series-parallel connection, and then the whole body formed by the plurality of battery cells 10 is accommodated in the box 20; definitely, the plurality of battery cells 10 can be connected in series or in parallel or in series-parallel connection to form the battery 100; and a plurality of batteries 100 are connected in series or in parallel or in series-parallel connection as a whole and are accommodated in the box 20. The plurality of battery cells 10 in the batteries 100 can be electrically connected through a confluence component, so that the parallel connection or series connection or series-parallel connection of the plurality of battery cells 10 in the battery modules 100 is realized.

Figure 3:
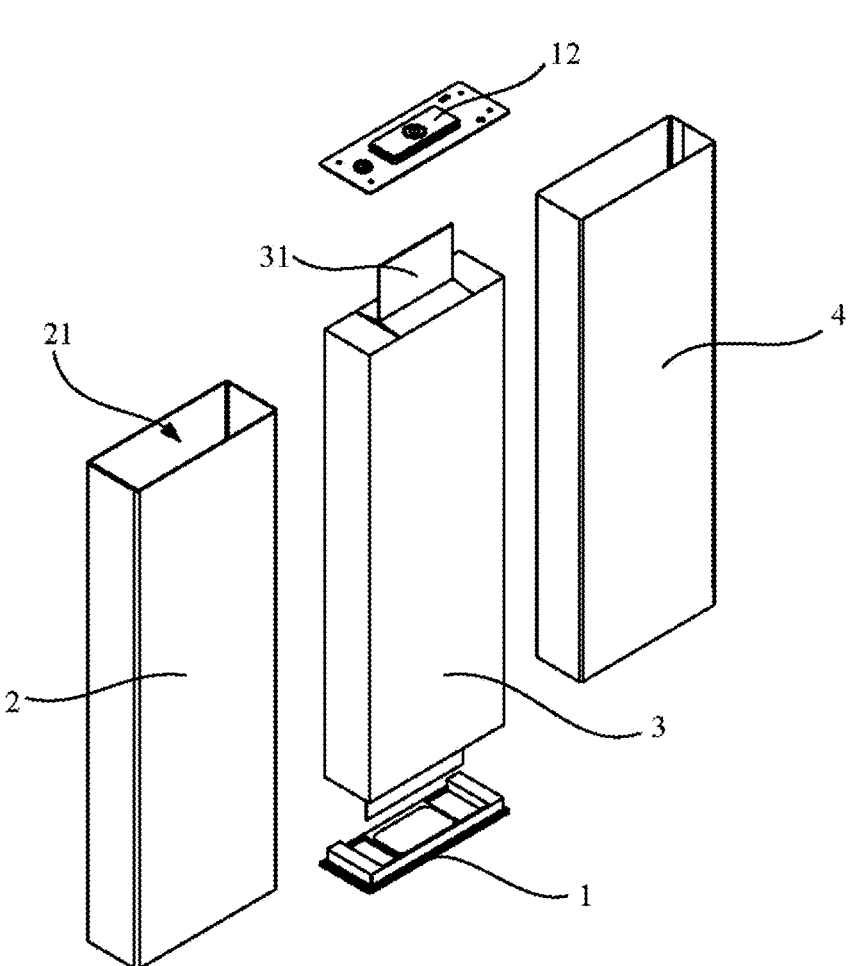
FIG. 3 is a structural schematic diagram of a battery cell according to some embodiments of the present application.

FIG. 3 is an exploded schematic diagram of a battery cell 10 according to some embodiments of the present application. The battery cell 10 refers to a minimum unit forming the battery 100. As shown in FIG. 3, in some embodiments of the present application, the battery cell 10 includes an end cover assembly 1, a case 2 and an electrode assembly 3. The case 2 includes an opening 21, and the end cover assembly 1 covers the opening 21; the electrode assembly 3 is arranged in the case 2, and the electrode assembly 3 includes a tab 31; and the tab 31 is configured to be electrically connected to a connecting area 121 of an electrode terminal 12 of the end cover assembly.

The end cover assembly 1 refers to a component which covers the opening 21 of the case 2 to isolate an internal environment of the battery cell 10 from an external environment. The end cover assembly 1 can be adapted to the case 2 by shape without limitation so as to be matched with the case 2. Optionally, the end cover assembly 1 can be made of a material (such as an aluminum alloy) with certain hardness and strength, so that the end cover assembly 1 is not easy to deform when being extruded and collided, the battery cell 10 can have higher structural strength, and the safety performance can be improved. There are many kinds of materials of the end cover assembly 1, such as copper, iron, aluminum, stainless steel, aluminum alloy and plastic, which is not limited in the embodiment of the present application.

Figure 4:
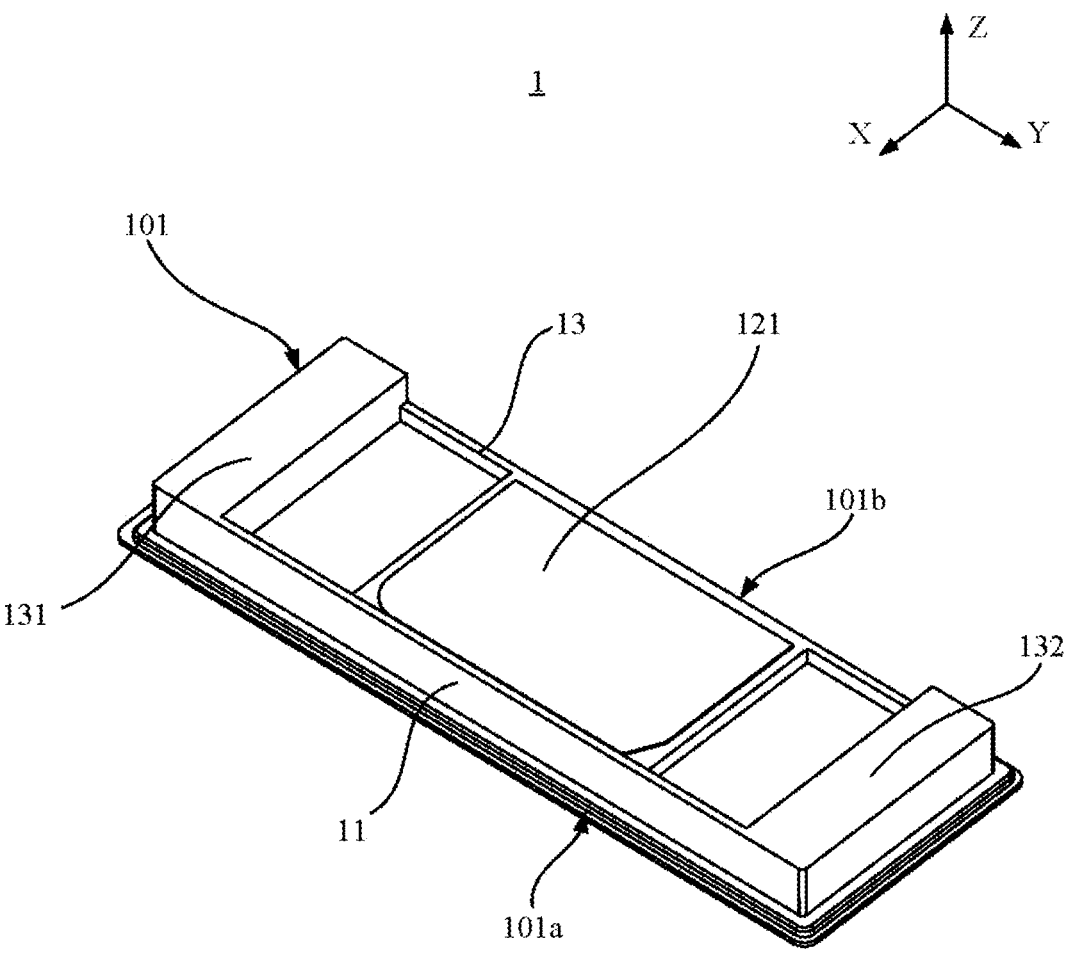
FIG. 4 is a structural schematic diagram of one example of an end cover according to some embodiments of the present application.
Figure 5:
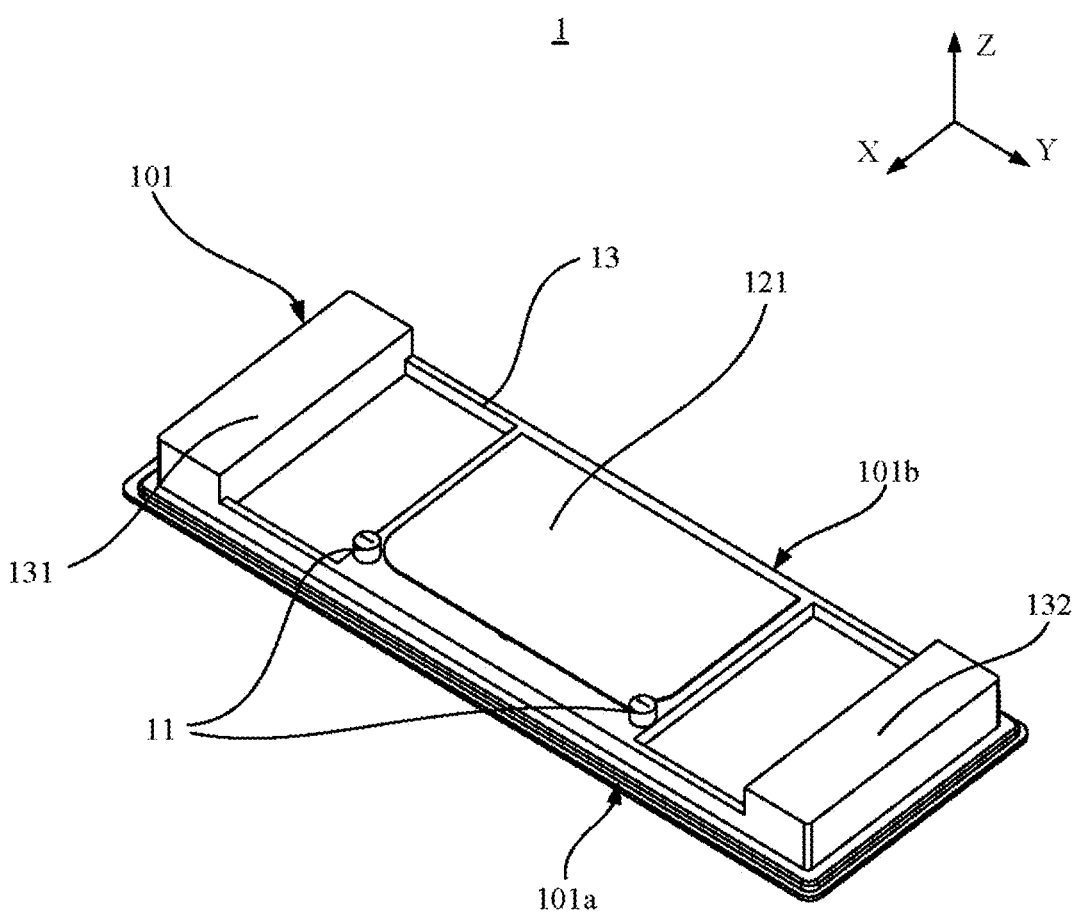
FIG. 5 is a structural schematic diagram of another example of an end cover according to some embodiments of the present application.

FIG. 4 is a structural schematic diagram of one example of an end cover assembly 1 according to some embodiments of the present application. FIG. 5 is a structural schematic diagram of another example of an end cover assembly 1 according to some embodiments of the present application. As shown in FIG. 4 and FIG. 5, in some embodiments of the present application, the end cover assembly 1 includes an end cover body 101, a fool-proof structural part 11 and an electrode terminal 12; the end cover body 101 includes a first edge 101a and a second edge 101b which are oppositely arranged in the width direction of the end cover assembly 1; the fool-proof structural part 11 is located on the side of the end cover body 101 facing the interior of the battery cell 10; the electrode terminal 12 passes through the end cover body 101; the electrode terminal 12 includes a connecting area 121 facing the interior of the battery cell 10; the connecting area 121 is used for electrically connecting with a tab 31 of an electrode assembly 3; in the width direction, the distance from the connecting area 121 to the first edge 101a is larger than the distance from the connecting area 121 to the second edge 101b; and the fool-proof structural part 11 is at least partially located on the side of the connecting area 121 close to the first edge 101a.

In order to facilitate description, in the embodiment of the present application, a direction X is taken as the width direction of the end cover assembly 1. It is to be understood that the width direction of the end cover assembly 1 may also be in other directions; and in order to facilitate indication for other factors such as the structures of the end cover assembly 1 and the battery cell 10, the other directions will be further defined in detail below, and will not be listed here.

Fool-proofing is a behavior constraint means for preventing and correcting, and a limiting method for avoiding errors is applied, so that an operator can directly implement correct operation without paying attention, experience or professional knowledge. The fool-proof structural part 11 is arranged on the surface of the end cover assembly 1 facing the case 2; and when the end cover assembly 1 covers the case 2 of the battery cell 10, the fool-proof structural part 11 can interfere with the electrode assembly 3 when the end cover assembly 1 is reversely installed, so that a situation that the battery cell 10 cannot be assembled because the relative direction of the end cover assembly 1 and the electrode assembly 3 is wrong can be avoided.

The first edge 101a and the second edge 101b are two opposite edges of the end cover assembly 1 in the width direction X, thus limiting the extension width of the end cover body 101 in the width direction X. The electrode terminal 12 is a component configured to output or input electric energy of the battery cell 10. The electrode terminal 12 passes through the end cover body 101, and the surface facing the battery cell 10 includes the connecting area 121, so that the connecting area 121 is electrically connected to the tab 31 of the electrode assembly 3 arranged in the case 2, and the electrode terminal 12 can conveniently provide electric energy to outside or take electric energy from inside. In the width direction X, the distance from the connecting area 121 to the first edge 101a is larger than the distance from the connecting area 121 to the second edge 101b, namely, the connecting area 121 is arranged in the surface of the end cover body 101 facing the battery cell 10, and is biased between the first edge 101a and the second edge 101b. Therefore, under a condition that the fool-proof structure is at least located on the side of the connecting area 121 close to the first edge 101a, the fool-proof structure is also biased on the end cover body 101, then the relative direction of the end cover assembly 1 and the electrode assembly 3 can be conveniently determined in the assembling process, and the fool-proofing effect is achieved. It is to be understood that it is needed to determine the specific position of the fool-proof structural part 11 in the width direction X according to the connection condition of the end cover assembly 1 and the electrode assembly 3, which is not limited in the embodiment of the present application.

The fool-proof structural part 11 is arranged on the side of the end cover body 101 facing the interior of the battery cell 10, the fool-proof structural part 11 can play an interference role on the electrode assembly 3 when the relative direction of the end cover assembly 1 and the electrode assembly 3 is wrong, thus whether the relative direction of the end cover assembly 1 and the electrode assembly 3 is correct or not can be determined, and the assembly efficiency and the success rate of the end cover assembly 1 are improved.

In some embodiments of the present application, in the thickness direction of the end cover assembly 1, the fool-proof structural part 11 extends towards a direction facing away from the exterior of the battery cell 10 and protrudes from the connecting area 121.

In order to facilitate description, in the embodiment of the present application, a direction Z is taken as the thickness direction of the end cover assembly 1 and is vertical to the width direction X. It is to be understood that the width direction X and the thickness direction Z are intersected with each other, and when an included angle between the width direction X and the thickness direction Z is 85°-95°, the width direction and the thickness direction can be regarded as being vertical to each other. Optionally, the thickness direction Z of the end cover assembly 1 can also be in other directions, and the width direction X and the thickness direction Z can also have other included angles.

The fool-proof structural part 11 extends towards the direction facing away from the exterior of the battery cell 10, which indicates that the fool-proof structural part 11 protrudes from the end cover body 101 to the interior of the battery cell 10 and protrudes from the connecting area 121. In the process that the electrode assembly 3 is connected to the connecting area 121, the fool-proof structural part 11 protruding from the connecting area 121 can interfere with the tab 31 of the electrode assembly 3 when the assembly position of the end cover assembly 1 is wrong, and moreover, the fool-proof structural part 11 can position the electrode assembly 3 in the width direction X, so that the electrode assembly 3 can be welded to the connecting area 121 more accurately.

In some embodiments of the present application, the end cover assembly 1 includes an insulating member 13, and the insulating member 13 is arranged on the side of the end cover body 101 facing the interior of the battery cell 10; and the fool-proof structural part 11 and the insulating member 13 are integrally formed.

The insulating member 13 is a component that ensures that other areas of the end cover assembly 1 are insulated from the electrode terminal 12. The insulating member 13 is arranged on the side of the end cover body facing the interior of the battery cell 10, and thus the safety problem of short-circuit connection between the electrode assembly 3 and other areas of the end cover assembly 1 can be released.

The fool-proof structural part 11 is also arranged on the side of the end cover body 101 facing the interior of the battery cell 10, and the fool-proof structural part 11 and the insulating member 13 are integrally formed, so that the structure of the end cover assembly 1 can be simplified, and the fool-proof structural part 11 can be reliably arranged on the end cover assembly 1.

In some embodiments of the present application, in the length direction Y of the end cover assembly 1, the insulating member 13 includes a first structural part 131 and a second structural part 132 which are oppositely arranged; the connecting area 121 and the fool-proof structural part 11 are located between the first structural part 131 and the second structural part 132; and the first structural part 131 and the second structural part 132 extend along the width direction X.

In order to express, in the embodiment of the present application, a direction Y is taken as the length direction of the end cover assembly 1, and the width direction X, the thickness direction Z and the length direction Y are vertical to one another. It is to be understood that when the included angles between the width direction X, the length direction Y and the thickness direction Z are 85°-95°, the width direction X, the length direction Y and the thickness direction Z can be regarded as being vertical to one another.

The first structural part 131 and the second structural part 132 are oppositely arranged in the length direction Y, which indicates that the first structural part 131 and the second structural part 132 are arranged at an interval in the length direction Y of the end cover assembly 1, and the first structural part 131 and the second structural part 132 are bumps that extend in the width direction X. The connecting area 121 and the fool-proof structural part 11 are sequentially arranged between the first structural part 131 and the second structural part 132 in the width direction X.

The first structural part 131 and the second structural part 132 are arranged, so an accommodating space is provided for the tab 31 while the end cover assembly 1 is prevented from being reversely installed, the risk of short circuit caused by a fact that the tab 31 is reversely inserted into the electrode assembly 3 is reduced, and the safety performance of the battery cell 10 is further improved.

Optionally, the first structural part 131 and the second structural part 132 can have the same shape or different shapes. The first structural part 131 and the second structural part 132 can be respectively arranged on two sides of the end cover assembly 1 in the length direction Y, or arranged close to the center of the end cover assembly 1, which is determined according to the size of the electrode assembly 3 in the length direction Y and is not limited in the embodiment of the present application.

In some embodiments of the present application, in the thickness direction of the end cover assembly 1, the fool-proof structural part 11, the first structural part 131 and the second structural part 132 extend in the direction facing away from the outside of the battery cell 10 and protrude from the connecting area 121.

The fool-proof structural part 11, the first structural part 131 and the second structural part 132 extend in the direction facing away from the outside of the battery cell 10, which indicates that the fool-proof structural part 11, the first structural part 131 and the second structural part 132 all protrude from the end cover body 101 to the interior of the battery cell 10 and more protrude from the connecting area 121. In the process that the electrode assembly 3 is connected to the connecting area 121, the fool-proof structural part 11, the first structural part 131 and the second structural part 132 which protrude from the connecting area 121 can provide a better supporting effect for the tab 31 of the electrode assembly 3, and moreover, the tab 31 can interfere with the fool-proof structural part 11 when the end cover assembly 1 is reversely installed, thus improving the assembly success rate and the production efficiency.

Optionally, in the thickness direction Z, the first structural part 131 and the second structural part 132 may have the same size. The first structural part 131 and the second structural part 132 are respectively arranged at the two ends of the end cover assembly 1 in the length direction Y and protrude from the end cover body 101 to the interior of the battery cell 100, so in the production process of the battery cell 10, the end cover assembly 1 covers the opening 21 of the case 2, and the first structural part 131 and the second structural part 132 extend into the case 2; and because the first structural part 131 and the second structural part 132 have the same size, the end cover assembly 1 can be better matched with the opening 21. It is to be understood that the sizes of the first structural part 131 and the second structural part 132 in the thickness direction Z may also be changed according to the specific structure of the interior of the battery cell 10, and thus the electrode assembly 3 and other structures in the battery cell 10 can be prevented from contact.

Optionally, in the thickness direction Z, the size of the fool-proof structural part 11 may be equal to that of the first structural part 131 and that of the second structural part 132, and may also be slightly larger than or slightly smaller than the size of the first structural part 131 and the size of the second structural part 132. Because the fool-proof structural part 11 protrudes from a first surface, when the end cover assembly 1 covers the opening 21 of the case 2, the fool-proof structural part 11 also extends into the case 2; if the fool-proof structural part 11 is too long, the fool-proof structure may be in contact with the electrode assembly 3 in the battery cell 10; if the fool-proof structural part 11 is too short, the fool-proofing effect cannot be achieved; and therefore, the fool-proof structural part 11 is to be proper in size in the thickness direction Z, which is not limited in the embodiment of the present application.

In some embodiments of the present application, the fool-proof structural part 11 is continuously arranged in the length direction of the end cover assembly 1.

With reference to FIG. 4, the fool-proof structural part 11 may be arranged to be a boss which is continuously arranged in the length direction Y, and under a condition that the electrode assembly 3 extends into the connecting area 121 from the width direction X to be connected to the connecting area 121, the boss can position the tab 31 of the electrode assembly 3.

With reference to FIG. 5, optionally, the fool-proof structural parts 11 may also be arranged to be a bump, and under the condition that only one bump is arranged, the bump extends in the length direction Y. With reference to the figure, under the condition that a plurality of bumps are provided, at least one bump is arranged at intervals in the length direction Y so as to achieve an interference effect on the electrode assembly 3. Optionally, the bump can be cylindrical, or can also be in a strip shape extending in the length direction Y, which is not limited in the embodiment of the present application.

The fool-proof structural part 11 is continuously arranged, so that the risk of short circuit caused by welding slag falling into the battery cell 10 when the end cover assembly 1 and the case 2 of the battery cell 10 are welded can be reduced to a certain extent, thus further improving the safety performance of the battery cell 10.

In some embodiments of the present application, the fool-proof structural part 11 is connected to at least one of the first structural part 131 and the second structural part 132.

The fool-proof structural part 11 can be connected to the first structural part 131 and the second structural part 132, or connected to one of the first structural part 131 and the second structural part 132, or not connected to both the first structural part 131 and the second structural part 132.

The fool-proof structural part 11 is further connected to the first structural part 131 and/or the second structural part 132, thus the risk of short circuit caused by welding slag falling into the battery cell 10 can be further prevented, and the safety performance of the battery cell 10 is improved; and moreover, the fool-proof structural part 11 is connected to the first structural part 131 and/or the second structural part 132, so that the structure can be further simplified, and the manufacturability is improved.

Optionally, the first structural part 131 and the second structural part 132 can be integrally formed with the fool-proof structural part 11. Under the condition that the fool-proof structural part 11 and the insulating member 13 are integrally formed, the fool-proof structural part 11, the first structural part 131 and the second structural part 132 can be made of the same insulating materials, such as plastic and rubber.

In some embodiments of the present application, the fool-proof structural part 11 is arranged on the side of the electrode terminal 12 facing the electrode assembly 3, and is integrally formed with the electrode terminal 12; and in the thickness direction of the end cover assembly 1, the projections of the fool-proof structural part 11 and the connecting area 121 are not overlapped.

The electrode terminal 12 is electrically connected to the electrode assembly 3, the fool-proof structural part 11 is arranged on the side of the electrode terminal 12 facing the electrode assembly 3, and is integrally formed with the electrode terminal 12, so the connection direction of the electrode assembly 3 and the connecting area 121 can be conveniently determined. In order to avoid the fool-proof structural part 11 arranged on the electrode terminal 12 from influencing the connection between the connecting area 121 and the tab 31 of the electrode assembly 3, the projection of the fool-proof structural part 11 is not overlapped with the projection of the connecting area 121 in the thickness direction, namely the fool-proof structural part 11 is arranged on the peripheral side of the connecting area 121 of the electrode terminal 12. It is to be clearly understood that in the embodiment, the connecting area 121 is not the whole surface of the electrode terminal 12 facing the electrode assembly 3, but only an area covered by the tab 31.

The fool-proof structural part 11 and the electrode terminal 12 are integrally formed, so the structure of the end cover assembly 1 can be simplified, and moreover, the fool-proof structural part 11 is arranged on the electrode terminal 12 and can further provide welding positioning for the tab 31 and the electrode terminal 12.

In some optional embodiments, a pressure relief mechanism configured to relieve the internal pressure when the internal pressure or temperature of the battery cell 10 reaches a threshold can be further arranged on the end cover assembly 1, which is not limited in the embodiment of the present application.

With reference to FIG. 3 again, in some embodiments of the present application, the case 2 is provided with two openings 21 which are oppositely arranged, two end cover assemblies 1 cover the two openings 21 respectively, and two tabs 31 extend out from the two ends of the electrode assembly 3 respectively.

Generally, when the case 2 is provided with the two openings 21, the tabs 31 extending from the two openings 21 are respectively treated as a positive electrode and a negative electrode of the electrode assembly 3. Therefore, the two end cover assemblies 1 respectively cover the two openings 21, the fool-proofing effect can be achieved in the process of respectively connecting the two end cover assemblies 1 to the two tabs 31 of the electrode assembly 3, and the battery cell 10 can be conveniently assembled.

Figure 6:
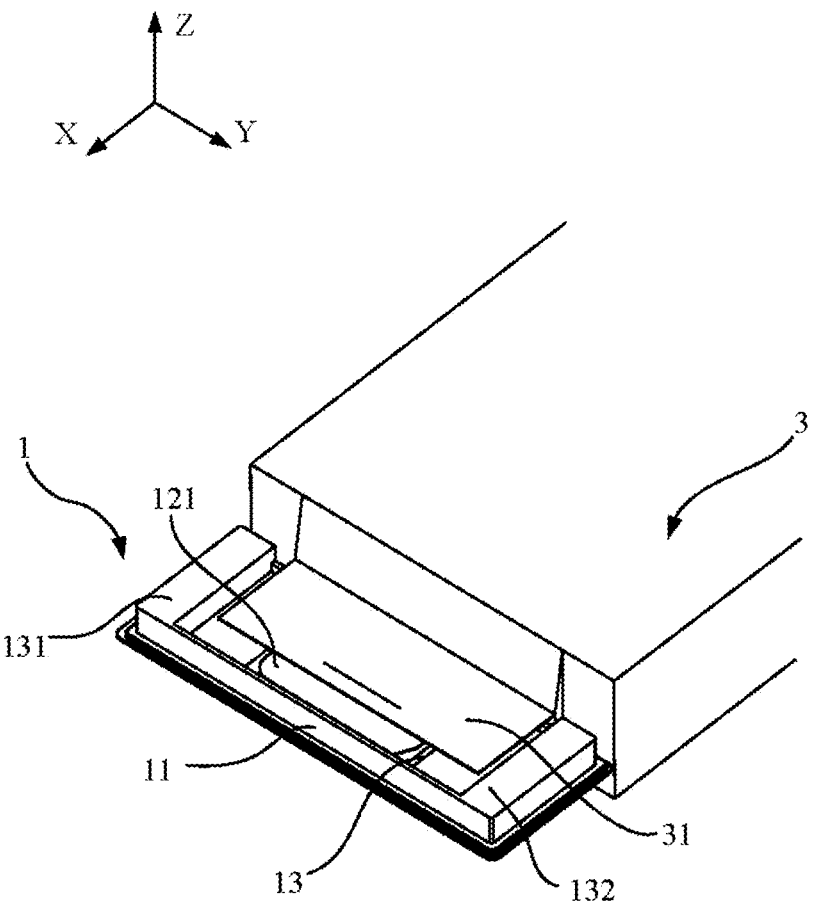
FIG. 6 is a schematic diagram of assembling of an end cover according to some embodiments of the present application.

FIG. 6 is a schematic diagram of assembling of an end cover assembly 1 according to some embodiments of the present application. As shown in FIG. 6, in some embodiments of the present application, the tab 31 covers the connecting area 121 and is connected to the electrode terminal 12 by welding.

The electrode assembly 3 is a component that can generate an electrochemical reaction in the battery cell 10. The case 2 may internally include one or more electrode assemblies 3. The electrode assembly 3 is mainly formed by winding or laminating a positive electrode plate and a negative electrode plate, and a diaphragm is usually arranged between the positive electrode plate and the negative electrode plate. The parts, with active materials, of the positive electrode plate and the negative electrode plate form a main body part of the electrode assembly 3; and the parts, without the active materials, of the positive electrode plate and the negative electrode plate respectively form the tabs 31. A positive electrode tab 31 and a negative electrode tab 31 can be jointly located at one end of the main body part or respectively positioned at two ends of the main body part. In the charging and discharging process of the battery, a positive electrode active material and a negative electrode active material react with the electrolyte, and the tabs 31 are connected to the electrode terminal 12 to form a current loop.

The tab 31 is connected to the connecting area 121 by welding to realize electrical connection between the electrode assembly 3 and the electrode terminal 12, so that the battery cell 10 has charging and discharging capability.

In some embodiments of the present application, in the width direction X of the end cover assembly 1, the projection of the fool-proof structural part 11 is at least partially overlapped with the projection of the tab 31.

The projection of the fool-proof structural part 11 in the width direction X indicates the arrangement position of the fool-proof structural part 11 in the width direction X, and the projection of the tab 31 in the width direction X indicates the width of the tab 31. In the width direction X, the projection of the fool-proof structural part 11 is at least partially overlapped with the projection of the tab 31, so that at least one part of the tab 31 can be interfered by the fool-proof structural part 11 when the end cover assembly 1 is reversely installed.

In some embodiments of the present application, the battery cell 10 further includes an adapter sheet (not shown in the figure), and the adapter sheet is configured to electrically connect the tab 31 and the electrode terminal 12; in the thickness direction of the end cover assembly 1, the adapter sheet is arranged between the tab 31 and the connecting area 121; and in the width direction of the end cover assembly 1, the projection of the fool-proof structural part 11 is at least partially overlapped with the projection of the adapter sheet and/or the tab 31.

The adapter sheet is a metal component arranged between the tab 31 and the connecting area 121, and the adapter sheet is arranged between the tab 31 and the connecting area 121 in the thickness direction Z, so that the tab 31 is connected to the connecting area 121 through the adapter sheet so as to be connected to the electrode terminal 12 to form the current loop.

In the width direction X, the projection of the fool-proof structural part 11 is at least partially overlapped with the projection of the tab 31 and/or the adapter sheet, thus, when the end cover assembly 1 is reversely installed, at least one part of the tab 31 or the adapter sheet can be interfered by the fool-proof structural part 11.

With reference to FIG. 3 again, the case 2 is an assembly matched with the end cover assembly 1 to form the internal environment of the battery cell 10, in which, the formed internal environment can be used for accommodating the electrode assembly 3, the electrolyte (not shown in the figure) and other components. The case 2 and the end cover assembly 1 can be independent components; the opening 21 can be formed in the case 2; and the end cover assembly 1 covers the opening 21 at the opening 21 position to form the internal environment of the battery cell 10. The case 2 can be in various shapes and various sizes, such as a cuboid shape, a cylinder shape, and a hexagonal prism shape. Specifically, the shape of the case 2 can be determined according to the specific shape and the size of the electrode assembly 3. There may be many kinds of materials of the case 2, such as copper, iron, aluminum, stainless steel, aluminum alloy, and plastic, which is not specifically limited in the embodiment of the present application.

In some alternative embodiments, an outer side of the electrode assembly 3 is also coated with an insulation film 4. The insulation film 4 can be synthesized by polyethylene, polypropylene or other high molecular polymer materials and coats the outer side of the electrode assembly 3, so that the electrode assembly 3 and the case 2 are insulated from each other. The insulation film 4 can prevent the electrode assembly 3 from being in direct contact with the case 2 to cause corrosion to the case 2, and the case 2 is protected from liquid leakage. Moreover, when the electrode assembly 3 coated with the insulation film 4 enters the case, the insulation film 4 can also effectively prevent the edge of the opening 21 of the case 2 from scratching the electrode assembly 3.

In some optional embodiments of the present application, the end cover assembly 1 applied the battery cell 10 includes the end cover body 101; the end cover assembly 1 comprises the end cover body 101, the fool-proof structural part 11 and the electrode terminal 12; the end cover body 101 includes the first edge 101a and the second edge 101b which are oppositely arranged in the width direction of the end cover assembly 1; the fool-proof structural part 11 is located on the side of the end cover body 101 facing the interior of the battery cell 10; the electrode terminal 12 passes through the end cover body 101; the electrode terminal 12 includes the connecting area 121 facing the interior of the battery cell 10; the connecting area 121 is used for electrically connecting with the tab 31 of the electrode assembly 3; the distance from the connecting area 121 to the first edge 101a is greater than that from the connecting area 121 to the second edge 101b in the width direction; and at least part of the fool-proof structural part 11 is located on the side of the connecting area 121 close to the first edge 101a, so that the relative direction of the end cover assembly 1 and the electrode assembly 3 can be determined through the fool-proof structural part 11, and the end cover assembly 1 is prevented from being reversely installed.

It is to be noted that, without conflict, the embodiments in the present application and the features in the embodiments may be combined with each other.

Finally, it should be noted that, the above embodiments are merely used for describing the technical solution of the present application, instead of limiting the present application; although the present application is described in detail with reference to the foregoing embodiments, persons of ordinary skill in the art should understand that they can still make modifications on the technical solution recorded in the above embodiments, or perform equivalent replacements on a part of technical features thereof; these modifications or replacements are not intended to make the essences of the corresponding technical solutions depart from the spirit and scope of the technical solutions of the embodiments of the present application.

What is claimed is:

1. An end cover assembly, being applied to a battery cell, the end cover assembly comprising:
   an end cover body which comprises a first edge and a second edge that are oppositely arranged in a width direction of the end cover assembly;
   a fool-proofing protrusion disposed on the end cover body and located on a side of the end cover body facing an interior of the battery cell; and
   an electrode terminal which passes through the end cover body, wherein the electrode terminal comprises a connecting area facing the interior of the battery cell, the connecting area is used for electrically connecting with a tab of an electrode assembly, and in the width direction, a distance from the connecting area to the first edge is larger than a distance from the connecting area to the second edge;
   wherein the fool-proofing protrusion is at least partially located on a side of the connecting area close to the first edge, and no protrusion protruding from the connecting area is provided at a location that is a mirror image of the fool-proofing protrusion with respect to a central plane parallel to the first edge and the second edge and orthogonally bisecting the end cover body.

2. The end cover assembly according to claim 1, wherein in a thickness direction of the end cover assembly, the fool-proofing protrusion extends in a direction facing away from an outside of the battery cell and protrudes from the connecting area.

3. The end cover assembly according to claim 2, wherein:
   the fool-proofing protrusion is arranged on a side of the electrode terminal facing the electrode assembly, and is integrally formed with the electrode terminal; and
   in the thickness direction of the end cover assembly, projections of the fool-proofing protrusion and the connecting area are not overlapped.

4. The end cover assembly according to claim 1, wherein the end cover assembly comprises an insulating member, the insulating member is arranged on the side of the end cover body facing the interior of the battery cell, and the fool-proofing protrusion and the insulating member are integrally formed.

5. The end cover assembly according to claim 4, wherein:
   in the length direction of the end cover assembly, the insulating member comprises a first structural part and a second structural part which are oppositely arranged;
   the connecting area and the fool-proofing protrusion are located between the first structural part and the second structural part; and
   the first structural part and the second structural part extend in the width direction.

6. The end cover assembly according to claim 5, wherein in the thickness direction of the end cover assembly, the fool-proofing protrusion, the first structural part and the second structural part extend in a direction facing away from the outside of the battery cell and protrude from the connecting area.

7. The end cover assembly according to claim 5, wherein the fool-proofing protrusion is continuously arranged along the length direction of the end cover assembly.

8. The end cover assembly according to claim 7, wherein the fool-proofing protrusion is connected to at least one of the first structural part and the second structural part.

9. A battery cell, comprising:

the end cover assembly according to claim 1;

a case which comprises an opening, wherein the end cover assembly covers the opening; and an electrode assembly which is arranged in the case and comprises a tab, wherein the tab is configured to be electrically connected to the connecting area.

10. The battery cell according to claim 9, wherein:

the case is provided with two openings which are oppositely arranged;

two end cover assemblies respectively cover the two openings; and two tabs respectively extend out from two ends of the electrode assembly.

11. The battery cell according to claim 9, wherein the tab covers the connecting area and is connected to the electrode terminal by welding.

12. The battery cell according to claim 9, wherein in the width direction of the end cover assembly, a projection of the fool-proofing protrusion is at least partially overlapped with a projection of the tab.

13. The battery cell according to claim 9, further comprising:

an adapter sheet, configured to electrically connect the tab to the electrode terminal;

wherein:

in a thickness direction of the end cover assembly, the adapter sheet is arranged between the tab and the connecting area; and in the width direction of the end cover assembly, a projection of the fool-proofing protrusion is at least partially overlapped with a projection of the adapter sheet and/or the tab.

14. A battery, comprising the battery cell according to claim 9.

15. An electrical apparatus, comprising the battery cell according to claim 9, wherein the battery cell is configured to provide electric energy.

* * * * *